US009724761B2

(12) United States Patent
Ramesh

(10) Patent No.: US 9,724,761 B2
(45) Date of Patent: Aug. 8, 2017

(54) CUTTING INSERT WITH A LINEAR AND A CONCAVE CUTTING EDGE PORTION

(71) Applicant: KENNAMETAL INDIA LIMITED, Bangalore (IN)

(72) Inventor: Karthic Ramesh, Bangalore (IN)

(73) Assignee: KENNAMETAL INDIA LIMITED, Bangalore (IN)

( * ) Notice: Subject to any disclaimer, the term of this patent is extended or adjusted under 35 U.S.C. 154(b) by 218 days.

(21) Appl. No.: 14/511,331

(22) Filed: Oct. 10, 2014

(65) Prior Publication Data

US 2015/0023743 A1  Jan. 22, 2015

Related U.S. Application Data

(63) Continuation-in-part of application No. 14/190,454, filed on Feb. 26, 2014.

(30) Foreign Application Priority Data

Mar. 22, 2013 (IN) .......................... 1249/CHE/2013

(51) Int. Cl.
B23C 5/20 (2006.01)
B23B 27/14 (2006.01)
B23B 51/04 (2006.01)

(52) U.S. Cl.
CPC .......... B23B 27/141 (2013.01); B23B 51/048 (2013.01); B23B 2200/0471 (2013.01);
(Continued)

(58) Field of Classification Search
CPC ...... B23B 2200/0471; B23B 2200/204; B23B 2200/242; B23B 2200/202; B23B 2200/205; B23B 2200/208; B23B 2200/36
See application file for complete search history.

(56) References Cited

U.S. PATENT DOCUMENTS 3,145,791 A  8/1964 Schlossin
3,785,236 A  1/1974 Peterson
(Continued)

FOREIGN PATENT DOCUMENTS

EP 0222951 5/1987
EP 0241973 10/1987
(Continued)

OTHER PUBLICATIONS

Sep. 24, 2015 Office action (3 months) 1-20140286719-K-04093-US-NP.
Feb. 8, 2016 Final Office Action-20140286719-K-04093-US-NP.

Primary Examiner — Will Fridie, Jr.
(74) Attorney, Agent, or Firm — Ian K. Samways

(57) ABSTRACT

A cutting insert includes a top face, a bottom face and a plurality of side walls extending between the top face and the bottom face. A central axis of the cutting insert extends through the top face and the bottom face. A peripheral cutting edge is defined at the juncture of each side wall and the top face. Each cutting edge includes a linear cutting edge portion having an end portion that connects to a concave cutting edge portion that curves inwardly in a plane that is perpendicular to a first plane containing the central axis, wherein at least one linear cutting edge portion and its corresponding end portion are parallel to the first plane containing the central axis.

20 Claims, 5 Drawing Sheets

(52) U.S. Cl.
CPC ... *B23B 2200/087* (2013.01); *B23B 2200/202* (2013.01); *B23B 2200/204* (2013.01); *Y10T 407/23* (2015.01); *Y10T 407/235* (2015.01); *Y10T 408/89* (2015.01)

(56) References Cited

U.S. PATENT DOCUMENTS

| | | | |
|---|---|---|---|
| 4,010,526 A | 3/1977 | Shephard | |
| 4,218,877 A | 8/1980 | McLain | |
| 4,659,264 A | 4/1987 | Friedline | |
| 4,681,488 A | 7/1987 | Markusson | |
| 4,762,372 A | 8/1988 | Rassmann et al. | |
| 5,082,401 A | 1/1992 | Niebauer | |
| 5,203,649 A | 4/1993 | Katbi et al. | |
| 5,246,315 A | 9/1993 | Hansson et al. | |
| 5,324,144 A | 6/1994 | Katbi et al. | |
| 5,472,027 A | 12/1995 | Ackerman | |
| 5,743,681 A | 4/1998 | Wiman et al. | |
| 5,921,721 A | 7/1999 | Hintze et al. | |
| 6,074,137 A | 6/2000 | Betman et al. | |
| 6,257,807 B1 | 7/2001 | Heinloth | |
| 6,352,538 B2 | 3/2002 | McGuire et al. | |
| 6,508,612 B1 | 1/2003 | Baca | |
| 6,527,486 B2* | 3/2003 | Wiman | B23B 27/141 407/113 |
| 6,742,969 B1 | 6/2004 | Hoefler | |
| 6,769,844 B2 | 8/2004 | Waggle | |
| 6,884,006 B2 | 4/2005 | Nagashima | |
| 7,040,844 B1* | 5/2006 | Daiguji | B23C 5/109 407/113 |
| 7,393,160 B2 | 7/2008 | Volokh | |
| 7,677,845 B2* | 3/2010 | Limell | B23B 27/1622 407/48 |
| 7,909,544 B2 | 3/2011 | Jansson | |
| 8,157,489 B2* | 4/2012 | Wolf | B23B 27/141 407/113 |
| 8,480,337 B2* | 7/2013 | Bae | B23B 51/048 407/113 |
| 9,272,335 B2* | 3/2016 | Ramesh | B23B 51/048 |
| 2002/0061235 A1 | 5/2002 | Maier | |
| 2003/0031520 A1 | 2/2003 | Hintze et al. | |
| 2003/0075032 A1 | 4/2003 | Porper | |
| 2003/0180103 A1 | 9/2003 | Nagaya et al. | |
| 2006/0029475 A1 | 2/2006 | Scherbarth | |
| 2006/0280567 A1 | 12/2006 | Craig | |
| 2010/0080662 A1 | 4/2010 | Satran et al. | |
| 2010/0178122 A1* | 7/2010 | Bae | B23B 51/048 408/223 |
| 2011/0038677 A1 | 2/2011 | Sung et al. | |
| 2011/0129310 A1 | 6/2011 | Dessoly et al. | |
| 2012/0087751 A1 | 4/2012 | Yamaguchi | |
| 2013/0022422 A1 | 1/2013 | Ramesh | |
| 2013/0022423 A1 | 1/2013 | Ramesh | |
| 2013/0108388 A1* | 5/2013 | Ishi | B23C 5/109 409/132 |
| 2013/0315684 A1* | 11/2013 | Ramesh | B23B 27/145 408/231 |
| 2014/0212235 A1 | 7/2014 | Prast et al. | |
| 2014/0286719 A1* | 9/2014 | Ramesh | B23B 51/048 408/199 |
| 2015/0023743 A1* | 1/2015 | Ramesh | B23B 51/048 407/113 |
| 2016/0023282 A1* | 1/2016 | Ramesh | B23B 51/048 408/233 |

FOREIGN PATENT DOCUMENTS

| | | |
|---|---|---|
| EP | 0269103 | 6/1988 |
| EP | 2394766 | 12/2011 |
| GB | 2157205 | 10/1985 |
| JP | 05228716 A | 9/1993 |
| JP | 09272006 A | 10/1997 |
| JP | 10193213 A | 7/1998 |
| JP | 2003275919 A | 9/2003 |
| JP | 2012086303 A | 5/2012 |
| WO | 2013016018 | 1/2013 |
| WO | WO2013003874 A1 | 1/2013 |

\* cited by examiner

CUTTING INSERT WITH A LINEAR AND A CONCAVE CUTTING EDGE PORTION

CROSS-REFERENCE TO RELATED APPLICATION

This application claims the benefit of U.S. patent application Ser. No. 14/190,454 filed Feb. 26, 2014, which is hereby fully incorporated herein by reference, which claims the benefit of Indian Application Number 1249/CHE/2013 filed Mar. 22, 2013, which is hereby fully incorporated herein by reference.

BACKGROUND OF THE INVENTION

The invention pertains generally to a cutting insert to be used in cutting tools during machining operations. More specifically, the invention pertains to a cutting insert having a linear and a concave cutting edge portion Cutting inserts of various geometries for use with many types of cutting tools during a machining operation are generally known. One example is various types of drilling tools that are used to drill or bore cylindrical holes in metal work pieces. The cutting or boring action of the drill tools may be carried out by an elongated, substantially cylindrical drilling tool that is typically attached to a tool holder/driving apparatus on one end and contains one or more cutting inserts on the opposing end for engaging the work piece. The use of replaceable cutting inserts is generally known and allows for quick changing of the insert upon wear of the cutting surfaces of the cutting insert, as well as allows for one drilling tool to be used for a variety of different drilling or boring applications by simply changing the insert and not the entire drilling tool assembly. In addition, indexable cutting inserts are commonly used such that multiple sides of the cutting insert can be used for cutting to prolong the useful life of the cutting insert.

Once a cutting insert engages a work piece, there are substantial forces that act on or are applied to the cutting insert. These forces in turn have a direct impact on the nature and quality of the cutting operation, i.e., the nature and quality of the cutting, drilling or boring action on the work piece.

The manufacture and installation/replacement of cutting inserts can be costly and time consuming. Thus, it is important that cutting inserts be durable and wear resistant while still being able to effectively provide the desired cutting operation.

Accordingly, there is a continual need for improved cutting inserts that overcome disadvantages, limitations and shortcomings of known cutting inserts. For example, there is a continual need for improved cutting inserts that can effectively absorb the cutting forces and reduce/minimize the amount of force acting upon the cutting insert during a cutting operation. In another example, there is a continual need for improved cutting inserts that have improved durability and wear resistance.

SUMMARY OF THE INVENTION

In accordance with an aspect of the invention, a cutting insert includes a top face, a bottom face and a plurality of side walls extending between the top face and the bottom face. A central axis of the cutting insert extends through the top face and the bottom face. A peripheral cutting edge is defined at the juncture of each side wall and the top face. Each cutting edge includes a linear cutting edge portion and a concave cutting edge portion that curves inwardly in a plane that is perpendicular to a plane containing the central axis. A radiused corner portion connects two adjacent cutting edges. Each linear cutting edge portion extends from one radiused corner portion to the concave cutting edge portion and each concave cutting edge portion extends from the linear cutting edge portion to another radiused corner portion.

In accordance with another aspect of the invention, a cutting insert includes an indexable, polygonal insert body having a top face, an opposing bottom seating surface and a plurality of side walls extending between the top face and the bottom seating surface. The cutting insert also includes a peripheral cutting edge defined at the intersection of each side wall and the top face, each cutting edge including a linear cutting edge portion and a concave cutting edge portion that has a greater length than the linear cutting edge portion. The concave cutting edge portion curves inwardly in a plane that is perpendicular to a plane containing a central axis of the cutting insert that extends through the top face and the bottom seating surface. The insert body further includes a radiused corner portion connecting two adjacent cutting edges.

In accordance with yet another aspect of the invention, a drilling tool includes a tool body having an axial rearward end having a shank portion and an axial forward end that defines an insert pocket. The drilling tool also includes a cutting insert structured and arranged to be removably received in the insert pocket of the tool body. The cutting insert includes a top face, a bottom seating surface and a plurality of side walls extending between the top face and the bottom seating surface. A peripheral cutting edge is defined at the juncture of each side wall and the top face. Each cutting edge includes a linear cutting edge portion and a concave cutting edge portion that curves inwardly in a plane that is perpendicular to a plane containing the central axis. A radiused corner portion connects two adjacent cutting edges. Each linear cutting edge portion extends from one radiused corner portion to the concave cutting edge portion and each concave cutting edge portion extends from the linear cutting edge portion to another radiused corner portion.

In accordance with an aspect of the invention, a cutting insert includes a top face, a bottom face and a plurality of side walls extending between the top face and the bottom face. A central axis of the cutting insert extends through the top face and the bottom face. A peripheral cutting edge is defined at the juncture of each side wall and the top face. Each cutting edge includes a linear cutting edge portion having an end portion that connects to a concave cutting edge portion that curves inwardly in a plane that is perpendicular to a first plane containing the central axis, wherein at least one linear cutting edge portion and its corresponding end portion are parallel to the first plane containing the central axis. A radiused corner portion connects two adjacent cutting edges. Each linear cutting edge portion extends from one radiused corner portion to the concave cutting edge portion and each concave cutting edge portion extends from the linear cutting edge portion to another radiused corner portion.

In accordance with another aspect of the invention, a cutting insert includes an indexable, polygonal insert body having a top face, an opposing bottom seating surface and a plurality of side walls extending between the top face and the bottom seating surface. The cutting insert also includes a peripheral cutting edge defined at the intersection of each side wall and the top face, each cutting edge including a linear cutting edge portion having an end portion that connects to a concave cutting edge portion that has a greater length than the linear cutting edge portion. The concave cutting edge portion curves inwardly in a plane that is perpendicular to a first plane containing a central axis of the cutting insert that extends through the top face and the bottom seating surface, wherein at least one linear cutting edge portion and its corresponding end portion are parallel to the first plane containing the central axis. The insert body further includes a radiused corner portion connecting two adjacent cutting edges.

In accordance with yet another aspect of the invention, a cutting insert includes an indexable, polygonal insert body having a top face, an opposing bottom seating surface and a plurality of side walls extending between the top face and the bottom seating surface. The cutting insert also includes a peripheral cutting edge defined at the intersection of each side wall and the top face, each cutting edge including a linear cutting edge portion having an end portion that connects to a concave cutting edge portion that has a greater length than the linear cutting edge portion. The concave cutting edge portion curves inwardly in a plane that is perpendicular to a first plane containing a central axis of the cutting insert that extends through the top face and the bottom seating surface, wherein at least one linear cutting edge portion and at least a portion of its corresponding end portion are parallel to the first plane containing the central axis. The insert body further includes a radiused corner portion connecting two adjacent cutting edges.

These and other aspects of the present invention will be more fully understood following a review of this specification and drawings.

DETAILED DESCRIPTION

The following description is for purposes of illustrating various aspects of the invention only and not for purposes of limiting the scope of the invention.

Figure 1:
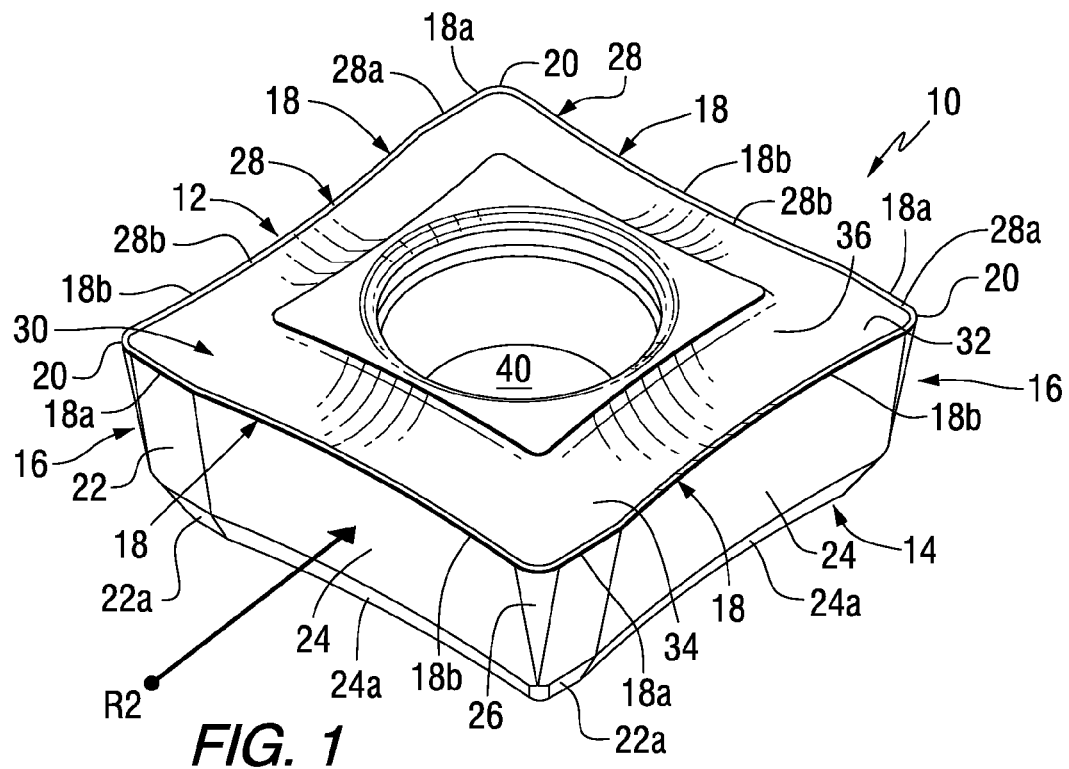
FIG. 1 is an isometric view of a cutting insert, in accordance with an aspect of the invention.
Figure 2:
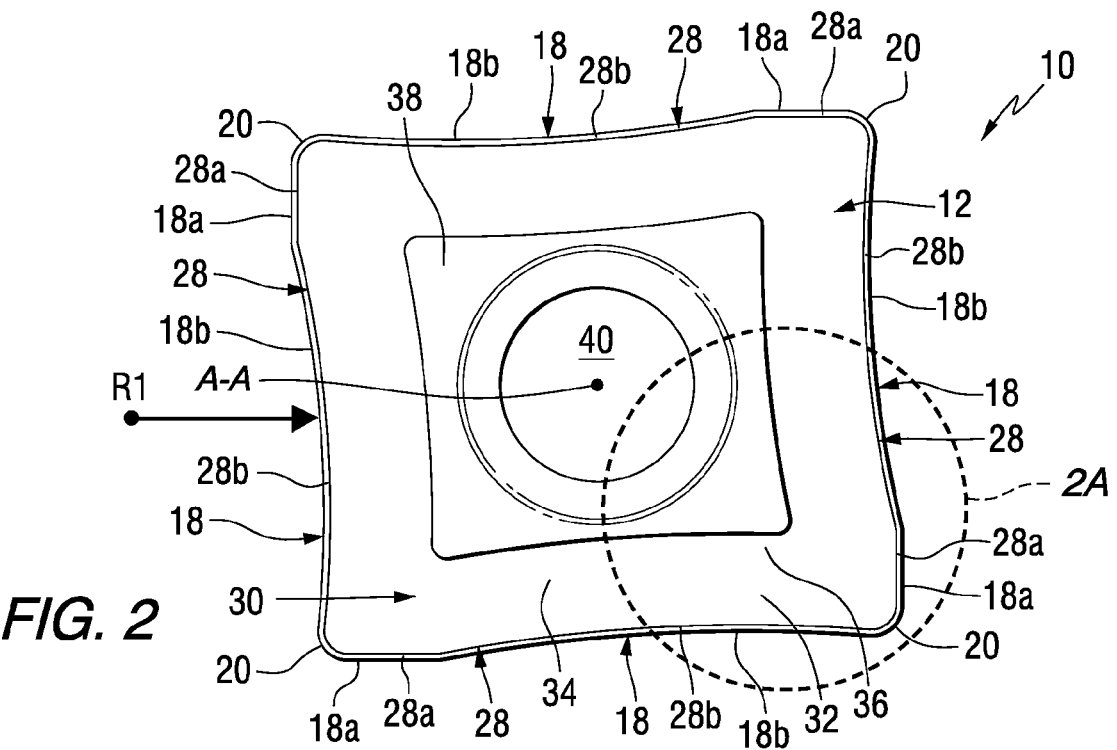
FIG. 2 is a top view of the cutting insert shown in FIG. 1, in accordance with an aspect of the invention.
Figure 2A:
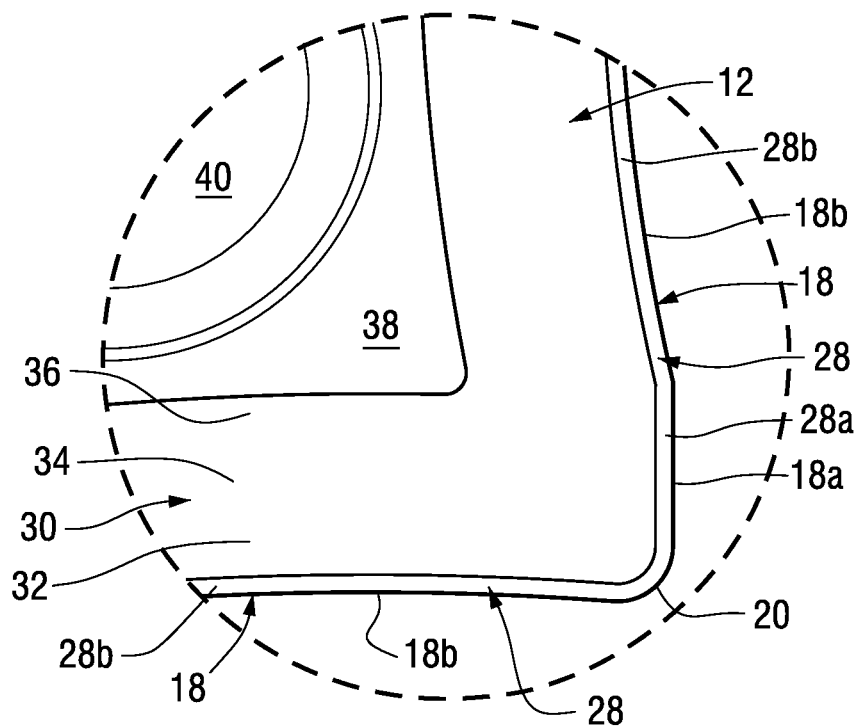
FIG. 2A is an enlarged, partial top view of a corner portion of FIG. 2, in accordance with an aspect of the invention.
Figure 3:
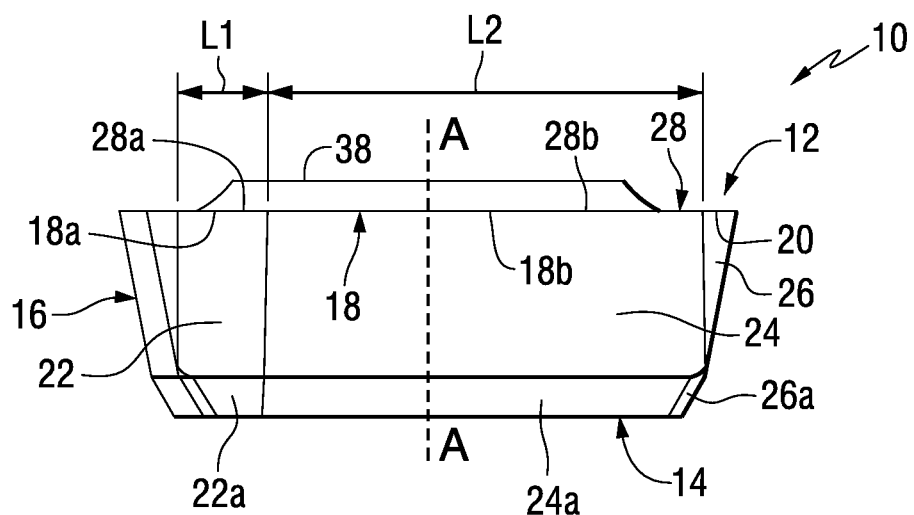
FIG. 3 is a front elevational view of the cutting insert shown in FIGS. 1 and 2, in accordance with an aspect of the invention.

Referring to FIGS. 1-3, there is illustrated a cutting insert, generally designated as reference number 10, in accordance with an aspect of the invention. The cutting insert 10 includes a top face 12 (which may also be referred to as a rake face), a bottom face 14 (which may also be referred to as a seating surface or bottom seating surface) and a plurality of side walls 16 (which may also be referred to as flanks or flank faces) extending between the top face 12 and the bottom face 14. The cutting insert 10 includes a central axis A-A that extends through or passes through the top face 12 and the bottom face 14.

In one aspect, the body of the cutting insert 10 is structured and arranged to be polygonal. While a generally a generally square cutting insert 10 having four sides is shown in the drawings for illustrative purposes only, it will be appreciated that other multi-sided or polygonal shapes (e.g. triangular, rectangular, pentagonal, etc.) may be utilized for the cutting insert of the present invention. In another aspect, the body of the cutting insert 10 is structured and arranged to be an indexable type cutting insert. In yet another aspect of the invention, the body of the cutting insert 10 is structured and arranged so that the side walls 16 slope or slant generally inwardly from the top face 12 to the bottom face 14 such that the bottom face is smaller than the top face 14.

Still referring to FIGS. 1-3, the cutting insert 10 also includes a peripheral cutting edge 18 defined at the juncture or intersection of each side wall 16 and the top face 12, in accordance with another aspect of the invention. Each cutting edge 18 includes a linear cutting edge portion 18a and a concave cutting edge portion 18b. In one aspect, the concave cutting edge portion 18b curves inwardly in a plane that is perpendicular to a plane containing the central axis, as illustrated, for example, FIG. 2. In one example, the concave cutting edge portion 18b curves inwardly in the plane of the top face 12 as shown in the top view of FIG. 2.

In another aspect, one or more of the concave cutting edge portions 18b can curve inwardly in a plane that contains one or more of the other concave cutting edge portions 18b.

The cutting insert 10 further includes a radiused corner portion 20 that connects two adjacent cutting edges 18. In one aspect, each radiused corner portion 20 connects a linear cutting edge portion 18a of one cutting edge 18 to a concave cutting edge portion 18b of an adjacent cutting edge 18.

The linear cutting edge portion 18a is generally a linear or straight edge that extends from a corresponding radiused corner portion 20 to where it meets the concave cutting edge portion 18b. In one aspect, the linear cutting edge portion 18a has a length L1 in the range of about 0.1 mm to about 12 mm.

The concave cutting edge portion 18b is generally a concave or inwardly curved edge that extends from a corresponding radiused corner portion 20 to where it meets the linear cutting edge portion 18a. In one aspect, the concave cutting edge portion 18b has a length L2 (measured, for example, linearly from one end of the concave cutting edge portion 18b adjacent a corresponding radiused corner portion 20 to the opposing end of the concave cutting edge portion 18b where it meets the linear cutting edge portion 18a) in the range of about 1 mm to about 30 mm. In one aspect, the concave cutting edge portion 18b has a greater length L2 than the length L1 of the linear cutting edge portion 18a, i.e. L2>L1. In another aspect, the ratio L2/(L1+L2)=about 80%. In yet another aspect, the range for the length L2 of cutting edge portion 18b is about 70% to about 90% of (L1+L2). In one example, the length L2 of cutting edge portion 18b is about 80% of (L1+L2)

In one aspect, the length L1 of the linear cutting edge 18a varies according to the relation: L1=about 20% of (L1+L2), for various insert sizes. In other words, L1/(L1+L2)=about 20%. In another aspect, the length of portion L1 of cutting edge 18a can be in the range of about 10% to about 30% of (L1+L2). In one example, the length of portion L1 of cutting edge 18a is about 20% of (L1+L2).

In another aspect of the invention, each side wall 16 includes a straight or flat side wall portion 22 adjacent the linear cutting edge portion 18*a* and extending generally downwardly from the linear cutting edge portion 18*a* toward the bottom face 14. The straight side wall portion 22 is a generally flat surface. In addition, the straight side wall portion 22 can extend continuously from the linear cutting edge portion 18*a* to the bottom face 14, or the straight side wall portion 22 can include a lower straight or flat side wall portion 22*a* adjacent the bottom face 14 that may slope or slant more inwardly than the straight side wall portion 22 to provide, for example, a seating surface or configuration for mounting the cutting insert 10 in a cutting tool, as will be described herein.

In another aspect of the invention, each side wall 16 also includes a concave side wall portion 24 adjacent the concave cutting edge portion 18*b* and extending generally downwardly from the concave cutting edge portion 18*b* toward the bottom face 14. The concave side wall portion 24 is a generally concave or inwardly curved surface. In addition, the concave side wall portion 24 can extend continuously from the concave cutting edge portion 18*b* to the bottom face 14, or the concave side wall portion 24 can include a lower concave side wall portion 24*a* adjacent the bottom face 14 that may slope or slant more inwardly than the concave side wall portion 24 to provide, for example, a seating surface or configuration for mounting the cutting insert 10 in a cutting tool.

In addition, a rounded corner side wall 26 is provided adjacent each radiused corner portion 20, wherein the rounded corner side wall 26 connects the concave side wall portion 18*b* of one side wall 16 with a straight side wall portion 18*a* of the adjacent side wall 16. The rounded corner side wall 26 can extend continuously from the radiused corner portion 20 to the bottom face 14, or the rounded corner side wall 26 can include a lower rounded corner side wall 26*a* adjacent the bottom face 14 that may slope or slant more inwardly than the rounded corner side wall 26.

The concave cutting edge portion 18*b* can have a radius R1 (see, for example, FIG. 2) in the range of about 1 mm to about 100 mm. The concave side wall portion 24 can have a radius R2 (see, for example, FIG. 1) in the range of about 0.8 mm to about 100 mm. In one aspect, the radius R2 of the concave side wall portion 24 is substantially the same as the radius R1 of the concave cutting edge portion 18*b*. In another aspect, the lower concave side wall portion 24*a* may also have a radius that is substantially the same as the radius R2 of the concave side wall portion 24. However, it will be appreciated that R1, R2 and/or the radius of the lower concave side wall portion 24*a* may have different radius dimensions as well.

Cutting edge 18 includes a top surface or portion 28 on or adjacent the top face 12 of the cutting insert 10. The top portion 28 includes a top portion 28*a* adjacent the linear cutting edge portion 18*a* and a top portion 28*b* adjacent the concave cutting edge portion 18*b*. The top portions that are contained in the same plane. In one aspect, the top portion 28 is contained in a single plane. In another aspect, the top portions 28*a* and 28*b* are contained in the same plane so as to form a straight, flat or continuous top portion 28 of the cutting edge 18 (see, for example FIG. 3).

The top face 12 can include a chip breaking groove 30 formed therein and extending alongside the cutting edges 18, in accordance with another aspect of the invention. The chip breaking groove 30 can extend partially or completely around periphery of the top face 12. The chip-breaking groove 30 includes a descending wall 32 which inclines downwardly from the cutting edges 18, e.g. downwardly from top portion 28 of the cutting edges 18, to a bottom area 34 of the chip breaking groove 30 and a back wall 36 which inclines upwardly from the bottom area 34 of the chip breaking groove 30. Advantageously, the chip breaking groove 30 provides for deflecting and/or bending the chips being removed from a work piece to improve the efficiency of the cutting insert 10.

The back wall 36 of the chip breaking groove 30 extends upwardly to a raised central top surface 38 of the top face 12 of the cutting insert 10. In one aspect, the raised central top surface 38 is elevated above the cutting edges 18. The raised central top surface 38 defines a mounting opening 40 that extends axially along axis A-A through the cutting insert 10.

Figure 4:
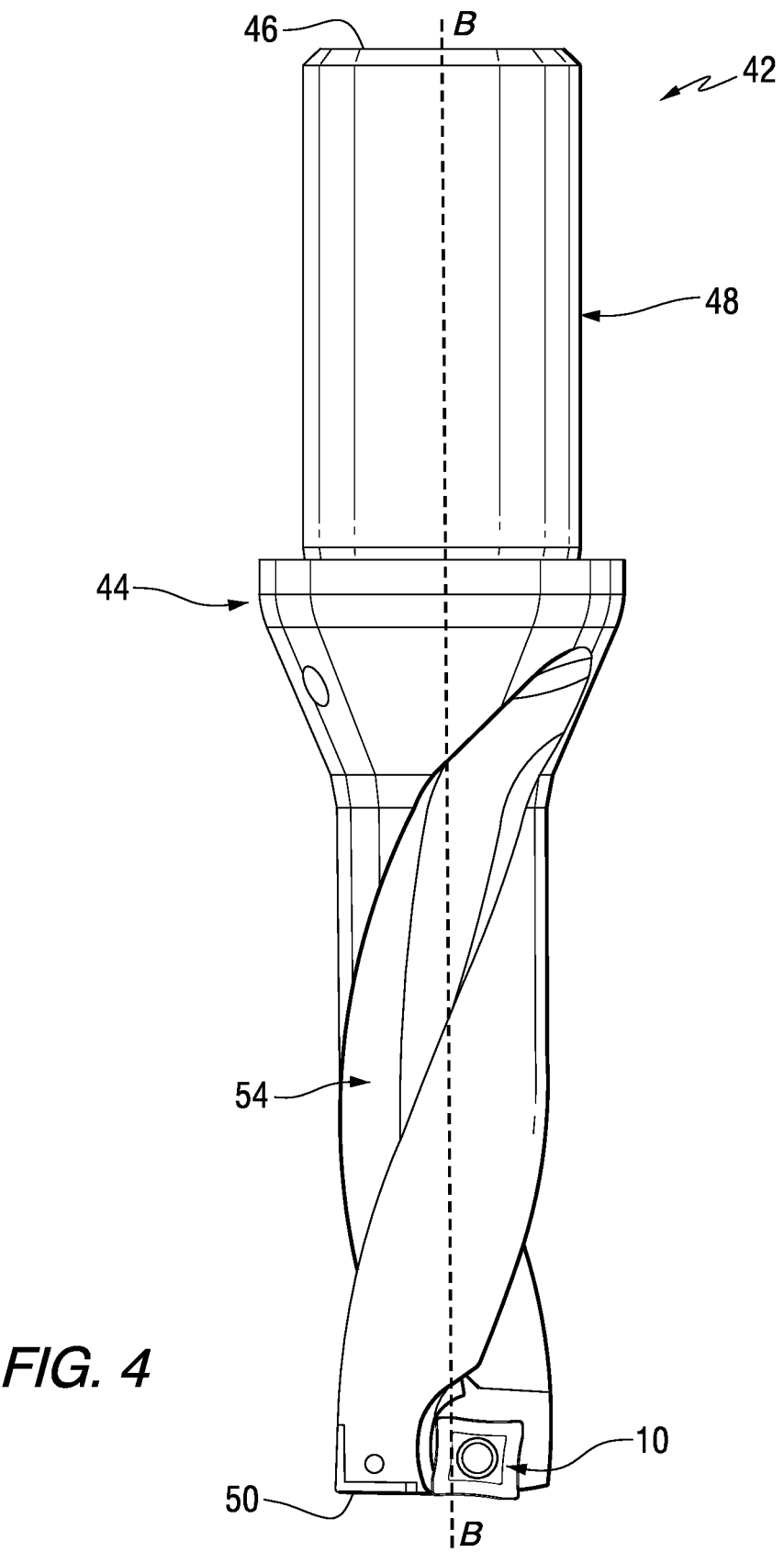
FIG. 4 is a view of a cutting tool, e.g. a drilling tool containing the cutting insert shown in FIGS. 1-3, in accordance with an aspect of the invention.
Figure 5:
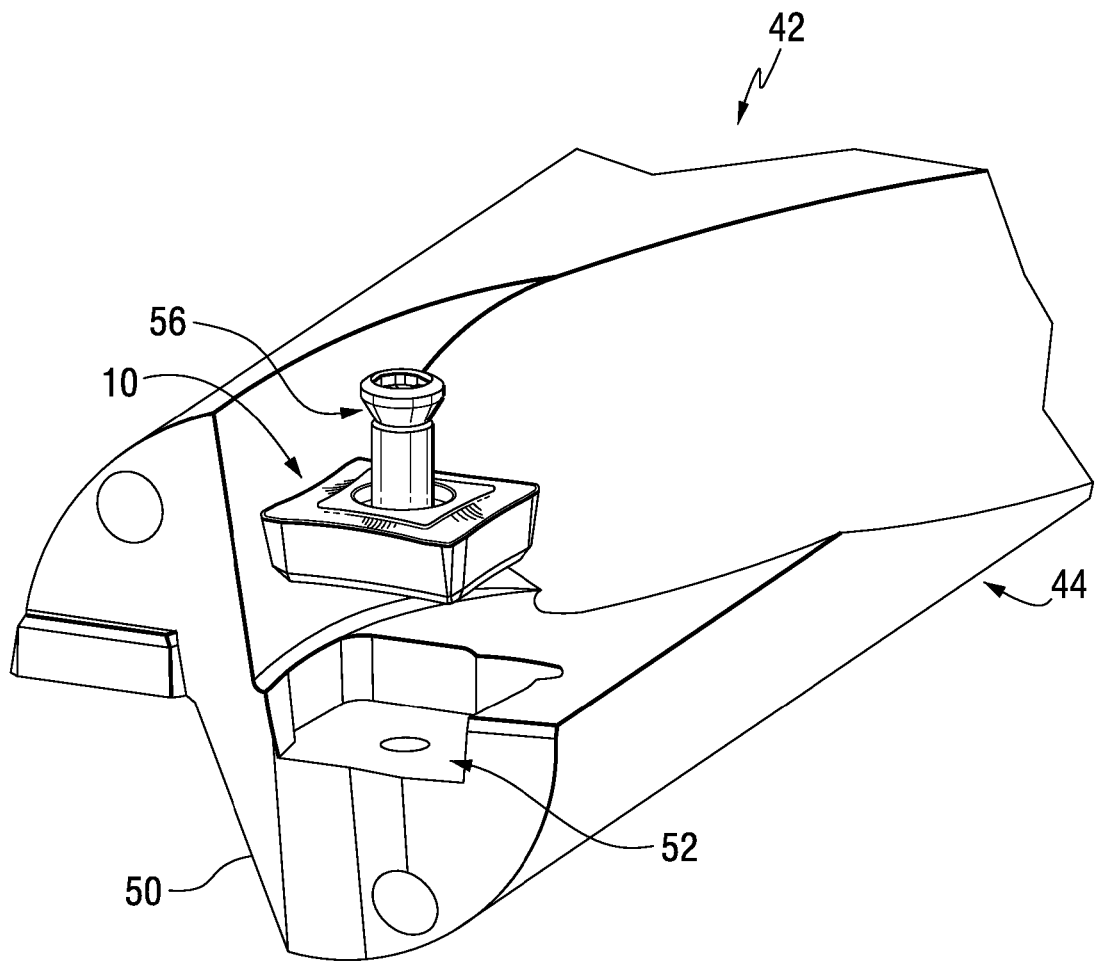
FIG. 5 is an enlarged, exploded view of an axial forward end of the drilling tool shown in FIG. 4, in accordance with another aspect of the invention.

Referring to FIGS. 4 and 5, there is illustrated a cutting tool, e.g. a drilling tool 42 for employing or utilizing one or more cutting inserts 10, in accordance with an aspect of the invention. The drilling tool 42 can include an elongated tool body 44 extending axially along elongated central axis B-B and having an axial rearward end 46 having a shank portion 48 and an axial forward end 50 that defines at least one insert pocket 52. The tool body 44 also can include flutes 54 formed therein. The cutting insert 10 is structured and arranged to be removably received in the insert pocket 52 of the tool body 44. In one aspect, the cutting insert 10 is received, positioned and/or mounted in the insert pocket 52 and held in place by an insert mounting screw 56 that is received in the mounting opening 40 of the cutting insert 10. It will be appreciated that other type cutting tools in addition to drilling tool 42 may be used in association with aspects of the invention.

Thus, it will be appreciated that the use of a combination of linear cutting edge 18*a* and concave cutting edge 18*b* promotes smoother and gradual engagement of the insert 10 into a workpiece during axial advancement of the cutting tool, e.g. drilling tool 42 towards the workpiece. At the same time, it also helps to stabilize the cutting forces and minimize lateral or radial drift of the drilling tool 42 during a cutting operation. This helps to keep within close tolerance the dimensional accuracy of the drilled hole in the workpiece.

Figure 6:
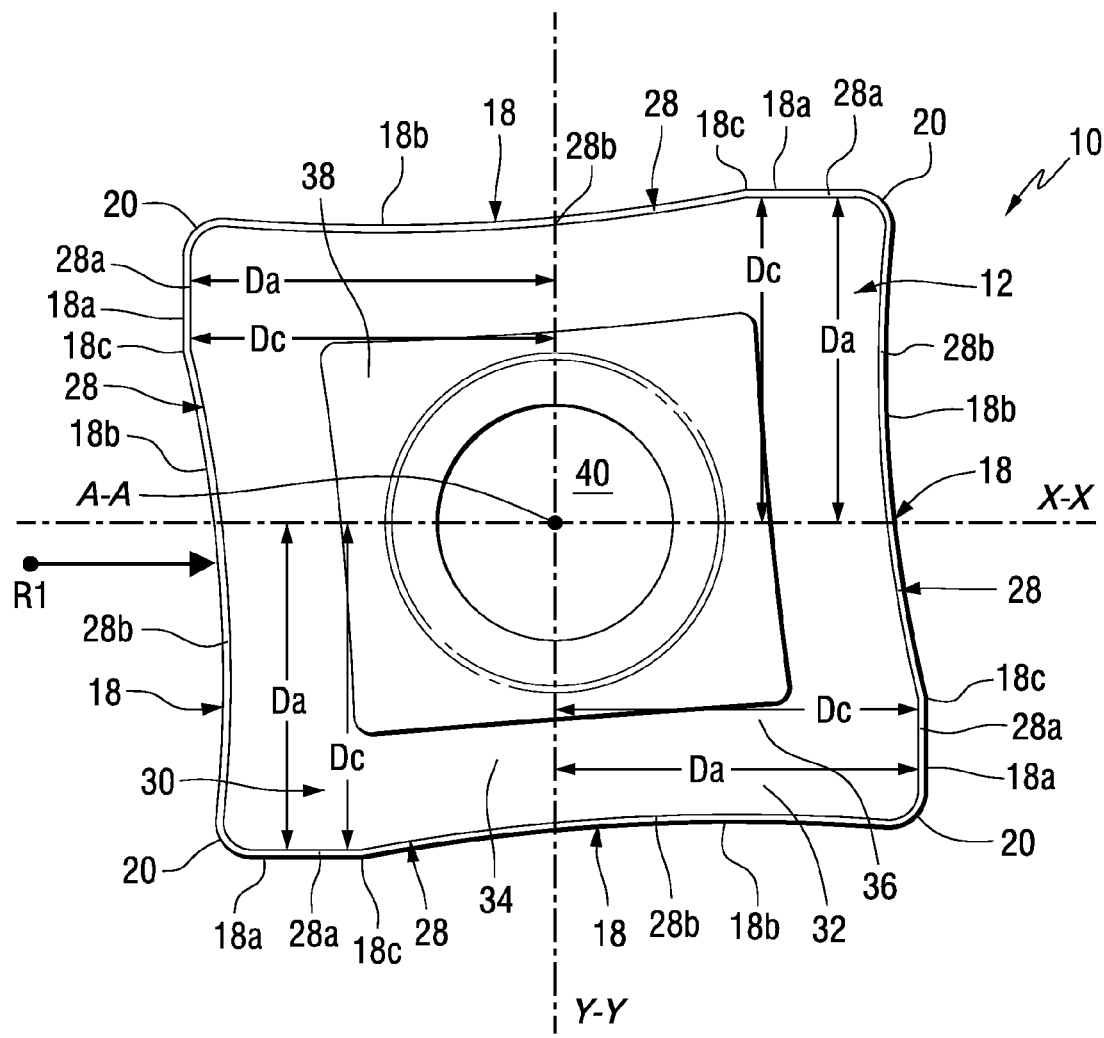
FIG. 6 is a top view similar to FIG. 2 illustrating additional aspects of the invention, in accordance with an aspect of the invention.

Referring to FIG. 6, there is set forth a top view similar to FIG. 2 but illustrating additional aspects of the invention. As illustrated, there is a first plane X-X containing the central axis A-A and a second plane Y-Y perpendicular to the first plane X-X and also containing the central axis A-A. In one aspect, each linear cutting edge portion 18*a* has an end portion 18*c* that connects to the concave cutting edge portion 18*b* that curves inwardly in a plane that is perpendicular to the first plane X-X and/or the second plane Y-Y.

In another aspect, at least one linear cutting edge portion 18*a* and its corresponding end portion 18*c* are parallel to the first plane X-X containing the central axis A-A (e.g. as shown in the upper right and/or lower left quadrants as defined by planes X-X and Y-Y of FIG. 6).

In another aspect, the at least one linear cutting edge portion 18*a* is a distance Da from the first plane X-X and its corresponding end portion 18*c* is a distance Dc from the first plane X-X, wherein Da=Dc, i.e. the at least one linear cutting edge portion 18*a* and its corresponding end portion 18*c* are equidistant from the first plane X-X (e.g. as shown in the upper right and/or lower left quadrants as defined by planes X-X and Y-Y of FIG. 6).

In another aspect, at least one other linear cutting edge portion 18*a* and its corresponding end portion 18*c* are parallel to the second plane Y-Y (e.g. as shown in the upper left and/or lower right quadrants as defined by planes X-X and Y-Y of FIG. 6).

In another aspect, the at least one other linear cutting edge portion 18*a* is a distance Da from the second plane Y-Y and its corresponding end portion 18*c* is a distance Dc from the second plane Y-Y, wherein Da=Dc, i.e. the at least one other linear cutting edge portion 18*a* and its corresponding end portion 18*c* are equidistant from the second plane Y-Y (e.g. as shown in the upper left and/or lower right quadrants as defined by planes X-X and Y-Y of FIG. 6).

In another aspect of the invention, the at least one linear cutting edge portion 18*a* and its corresponding end portion 18*c* (shown in the upper right and/or lower left quadrants as defined by planes X-X and Y-Y of FIG. 6) are perpendicular to the at least one other linear cutting edge portion 18*a* and its corresponding end portion 18*c* (shown in the upper left and/or lower right quadrants as defined by planes X-X and Y-Y of FIG. 6). In other words, linear cutting edge portions 18*a* and their corresponding end portions 18*c* that are adjacent to one another are perpendicular to one another.

In one aspect, the end portion 18*c* is a segment that essentially joins linear cutting edge portion 18*a* to concave cutting edge portion 18*b*. For example, end portion 18*c* can be a point or a linear segment.

In another aspect, the end portion 18*c* could be a curve, or a simple radius. In the aspect where the end portion 18*c* is a curve or radius, only the part of the curve or radius connecting with 18*a* will be parallel to X-X (or Y-Y), or equidistant, i.e., Da=Dc. In this situation where the end portion 18*c* is a curve or radius, the part of the curve or radius which connects to the concave cutting edge portion 18*b* will not satisfy Da being equal to Da. In one such aspect, for example, Da>Dc. Thus, in accordance with aspects of the invention as set forth herein, at least a portion of the end portion 18*c* may be parallel to X-X (or Y-Y), and/or equidistant, i.e., Da=Dc etc.

Advantageously, the combination of the linear cutting edge 18*a* with the concave cutting edge 18*b* joined together by the end portion 18*c* allows for gradual plunging or entry of the entire cutting edge 18 into the workpiece. This gradual entry makes for smoother drilling. Otherwise, the entry into the workpiece would be not smooth with almost the entire cutting edge entering the workpiece instantaneously.

Whereas particular aspects of this invention have been described above for purposes of illustration, it will be evident to those skilled in the art that numerous variations of the details of the present invention may be made without departing from the invention as defined in the appended claims.

What is claimed is:

1. A cutting insert, comprising:
a top face;
a bottom face, wherein a central axis of the cutting insert extends through the top face and the bottom face;
a plurality of side walls extending between the top face and the bottom face;
a peripheral cutting edge defined at the juncture of each side wall and the top face, each cutting edge including a linear cutting edge portion having an end portion that connects to a concave cutting edge portion that fully curves inwardly in a plane that is perpendicular to a first plane containing the central axis, wherein at least one linear cutting edge portion and its corresponding end portion are parallel to the first plane containing the central axis; and
a radiused corner portion connecting two adjacent cutting edges, wherein, along one of the two adjacent cutting edges:
the linear cutting edge portion directly extends from the radiused corner portion to the concave cutting edge portion; and
the concave cutting edge portion directly extends from the end portion of the linear cutting edge portion to another radiused corner portion;
wherein the concave cutting edge portion and the linear cutting edge portion are coplanar with respect to one another.

2. The cutting insert of claim 1, wherein the at least one linear cutting edge portion and its corresponding end portion are equidistant from the first plane containing the central axis.

3. The cutting insert of claim 2, wherein at least one other linear cutting edge portion and its corresponding end portion are parallel to a second plane that is perpendicular to the first plane and also contains the central axis.

4. The cutting insert of claim 3, the at least one other linear cutting edge portion and its corresponding end portion are equidistant from the second plane containing the central axis.

5. The cutting insert of claim 4, wherein the at least one linear cutting edge portion and its corresponding end portion are perpendicular to the at least one other linear cutting edge portion and its corresponding end portion.

6. The cutting insert of claim 1, wherein each side wall includes a flat side wall portion adjacent the linear cutting edge portion and each side wall further includes a concave side wall portion adjacent the concave cutting edge portion.

7. The cutting insert of claim 6, wherein the concave side wall portion has a radius that is substantially the same as a radius of the concave cutting edge portion.

8. The cutting insert of claim 6, further including a rounded corner side wall adjacent each radiused corner portion, wherein the rounded corner side wall connects the concave side wall portion of one side wall with a flat side wall portion of the adjacent side wall.

9. The cutting insert of claim 1, wherein the concave cutting edge portion has a greater length than the linear cutting edge portion.

10. The cutting insert of claim 1, wherein the linear cutting edge portion and the concave cutting edge portion each include top portions that are contained in the same plane, each top portion comprising a flat surface which extends from each of the linear cutting edge portion and the concave cutting edge portion toward the central axis.

11. A cutting insert, comprising:
an indexable, polygonal insert body having a top face, an opposing bottom seating surface and a plurality of side walls extending between the top face and the bottom seating surface;
a peripheral cutting edge defined at the intersection of each side wall and the top face, each cutting edge including a linear cutting edge portion having an end portion that directly connects to a concave cutting edge portion that has a greater length than the linear cutting edge portion, wherein the concave cutting edge portion fully curves inwardly in a plane that is perpendicular to a first plane containing a central axis of the cutting insert that extends through the top face and the bottom seating surface, wherein at least one linear cutting edge portion and its corresponding end portion are parallel to the first plane containing the central axis; and the insert body further includes a radiused corner portion connecting two adjacent cutting edges, wherein along one of the two adjacent cutting edges;

the concave cutting edge portion directly connects to the radiused corner portion; and wherein the concave cutting edge portion and the linear cutting edge portion are coplanar with respect to one another.

12. The cutting insert of claim 11, wherein the at least one linear cutting edge portion and its corresponding end portion are equidistant from the first plane containing the central axis.

13. The cutting insert of claim 12, wherein at least one other linear cutting edge portion and its corresponding end portion are parallel to a second plane that is perpendicular to the first plane and also contains the central axis.

14. The cutting insert of claim 13, the at least one other linear cutting edge portion and its corresponding end portion are equidistant from the second plane containing the central axis.

15. The cutting insert of claim 14, wherein the at least one linear cutting edge portion and its corresponding end portion are perpendicular to the at least one other linear cutting edge portion and its corresponding end portion.

16. A cutting insert, comprising:

an indexable, polygonal insert body having a top face, an opposing bottom seating surface and a plurality of side walls extending between the top face and the bottom seating surface;

a peripheral cutting edge defined at the intersection of each side wall and the top face, each cutting edge including a linear cutting edge portion having an end portion that directly connects to a concave cutting edge portion that has a greater length than the linear cutting edge portion, wherein the concave cutting edge portion fully curves inwardly in a plane that is perpendicular to a first plane containing a central axis of the cutting insert that extends through the top face and the bottom seating surface, wherein at least one linear cutting edge portion and at least a portion of its corresponding end portion are parallel to the first plane containing the central axis; and the insert body further includes a radiused corner portion connecting two adjacent cutting edges, wherein along one of the two adjacent cutting edges;

the concave cutting edge portion directly connects to the radiused corner portion; and wherein the concave cutting edge portion and the linear cutting edge portion are coplanar with respect to one another.

17. The cutting insert of claim 16, wherein the at least one linear cutting edge portion and the at least a portion of its corresponding end portion are equidistant from the first plane containing the central axis.

18. The cutting insert of claim 17, wherein at least one other linear cutting edge portion and at least a portion of its corresponding end portion are parallel to a second plane that is perpendicular to the first plane and also contains the central axis.

19. The cutting insert of claim 18, the at least one other linear cutting edge portion and the at least a portion of its corresponding end portion are equidistant from the second plane containing the central axis.

20. The cutting insert of claim 19, wherein the at least one linear cutting edge portion and the at least a portion of its corresponding end portion are perpendicular to the at least one other linear cutting edge portion and the at least a portion of its corresponding end portion.

\* \* \* \* \*